United States Patent [19]

Presby

[11] Patent Number: 4,676,594
[45] Date of Patent: Jun. 30, 1987

[54] OPTICAL FIBER MODE SCRAMBLER

[75] Inventor: Herman M. Presby, Highland Park, N.J.

[73] Assignees: American Telephone and Telegraph Company; AT&T BELL LABORATORIES, both of Murray Hill, N.J.

[21] Appl. No.: 671,932

[22] Filed: Nov. 16, 1984

[51] Int. Cl.$^4$ .............................................. G02B 6/16
[52] U.S. Cl. ............................ 350/96.29; 350/96.15; 350/96.30
[58] Field of Search ............... 350/96.15, 96.16, 96.29, 350/96.30

[56] References Cited

U.S. PATENT DOCUMENTS

| | | | |
|---|---|---|---|
| 3,891,302 | 6/1975 | Dabby et al. | 350/96.30 X |
| 4,229,067 | 10/1980 | Love | 350/96.15 |
| 4,362,357 | 12/1982 | Stockmann et al. | 350/96.16 |
| 4,372,645 | 2/1983 | Miller | 350/96.30 |
| 4,449,783 | 5/1984 | Witte | 350/96.16 |
| 4,514,057 | 4/1985 | Palmer et al. | 350/96.16 X |
| 4,558,920 | 12/1985 | Newton et al. | 350/96.16 X |
| 4,630,890 | 12/1986 | Ashkin et al. | 350/96.30 |

OTHER PUBLICATIONS

Mikoshiba et al., App. Optics, Sep. 1978, vol. 17, pp. 2836-2841.
Tokuda et al., Electronics Letters, Mar. 3, 1977, vol. 13, No. 5, pp. 146-147.
Ikeda et al., App. Optics, Apr. 1977, vol. 16, No. 4, pp. 1045-1049.
Mikoshiba et al., App. Optics, Sep. 1978, vol. 17, pp. 2836-2841.
Storozum, Electronics, vol. 4, No. 54, Feb., 1981, pp. 163-166.
Yoshida et al., Conf. Lasers & Electrooptics, Jun. 10-12, 1981, Washington, D.C., pp. 56-58.
Kokubun et al., Electronic Letters, Nov. 24, 1983, vol. 19, No. 24, pp. 1009-1010.
Barnoski, Fundamentals of Optical Fiber Communications, 2nd Edition, 1981, Academic Press, pp. 334-340.

Primary Examiner—William L. Sikes
Assistant Examiner—Akm E. Ullah
Attorney, Agent, or Firm—Erwin W. Pfeifle

[57] ABSTRACT

The present invention relates to a mode scrambling arrangement for a multimode or graded-index optical fiber and, more particularly, to an optical fiber mode scrambler achieved by forming a deformation as, for example, a groove or notch on one side of the multimode or graded-index optical fiber orthogonal to the longitudinal axis thereof. The groove or notch can be produced by any suitable etching or machining process to extend through the cladding layer and at least very slightly into the outer surface of the core of the multimode or graded-index optical fiber. The depth of the groove or notch into the core can be controlled by monitoring the mode pattern in the multimode fiber during the etching or machining process to provide maximum mode scrambling with minimal loss.

4 Claims, 2 Drawing Figures

OPTICAL FIBER MODE SCRAMBLER

TECHNICAL FIELD

The present invention relates to an optical fiber mode scrambler and, more particularly, to an optical fiber mode scrambler achieved by forming a notch or groove in a multimode fiber orthogonal to the longitudinal axis of the fiber, the notch extending through the cladding and at least minutely into the core of the multimode fiber on one side thereof. Additional mode scramblers in accordance with the present invention can be disposed along the length of the fiber.

DESCRIPTION OF THE PRIOR ART

Mode scramblers for optical fibers have found important use to, for example, avoid any deviation in transmission characteristics at various points along the fiber and provide for the propagation of all the possible modes. They are becoming increasingly important in optical fiber Local Area Network applications to ensure that all terminals connected to a fiber bus can share information with each other by sufficiently mixing the modes carrying the communication so that each terminal receives an equal share. One type of mode scrambler for optical fibers is disclosed in U.S. Pat. No. 4,229,067 issued to W. F. Love on Oct. 21, 1980. There, the optical waveguide scrambler includes a length of high-alpha optical waveguide optically coupled to a length of low-alpha optical waveguide to provide spatial and angular mixing of light propagating therethrough.

Another arrangement for an optical fiber mode scrambler is disclosed in, for example, the articles "Measurement of Baseband Frequency Response of Multimode Fibre By Using A New Type Of Mode Scrambler" by M. Tokuda et al in *Electronic Letters*, 3rd March 1977, Vol. 13, No. 5 at pages 146-147; and "Transmission Characteristics Of Multimode W-Type Optical Fiber: Experimental Study Of The Effect Of The Intermediate Layer" by K. Mikoshiba et al in *Applied Optics*, Vol. 17, No. 17, Sept., 17, 1978, at pages 2836-2841. In these articles the mode scrambler disclosed includes an optical fiber comprising specific sinusoidal serpentine bends.

Another form of an optical fiber mode scrambler is disclosed in, for example, the articles "Mode Scrambler For Optical Fibers" by M. Ikeda et al in *Applied Optics*, April 1977, Vol. 16, No. 4, at pages 1045-1049; and "Mode Scrambling Can Enhance Fiber Optic System Performance" by S. L. Storozum in *Electronics*, Feb. 24, 1981, Vol. 4, No. 54, at pages 163-166. The mode scrambler in these articles comprises a few fibers in a bundle surrounded by a heat shrinkable tube which when shrunk causes fiber microbending.

Star couplers for providing mode transfer and enhancement are also well known and comprise a first plurality of fibers interconnected to a second plurality of fibers by means of a mixing element either comprising a planar waveguide section or formed by twisting and fusing the twisted waveguides together. In this regard see, for example, U.S. Pat. Nos. 4,362,357 issued to M. Stockmann et al on Dec. 7, 1982, and 4,449,783 issued to H. H. Witte on May 22, 1984; or the book "Fundamentals Of Optical Fiber Communications" by M. K. Barnoski, 2nd Edition, Academic Press, 1981, at pages 337-339.

The problem remaining in the prior art is to provide a mode scrambler in a multimode optical fiber which is simple to produce and provides a desired amount of mode scrambling with a minimal of loss.

SUMMARY OF THE INVENTION

The foregoing problem has been solved according to the present invention which relates to an optical fiber mode scrambler and, more particularly, to an optical fiber mode scrambler achieved by forming a notch or groove on one side of a multimode fiber orthogonal to the longitudinal axis of the fiber, the notch extending through the cladding and at least penetrating the outer surface of the core of the multimode fiber.

It is an aspect of the present invention to provide a mode scrambler in optical fiber form which comprises a deformation as, for example, a notch or groove on one side of a multimode fiber where one or more of such mode scramblers may be disposed at selective points along a length of multimode fiber to ensure mode enhancement at these points. The mode scramblers can be formed by any technique as, for example, etching, machining, etc. By monitoring the mode pattern of a light communication signal propagating in the optical fiber during the formation of the deformation, the technique can be stopped whenever a desired mode pattern is achieved.

Other and further aspects of the present invention will become apparent during the course of the following description and by reference to the accompanying drawings.

BRIEF DESCRIPTION OF THE DRAWINGS

Referring now to the drawings.

DETAILED DESCRIPTION

Figure 1:
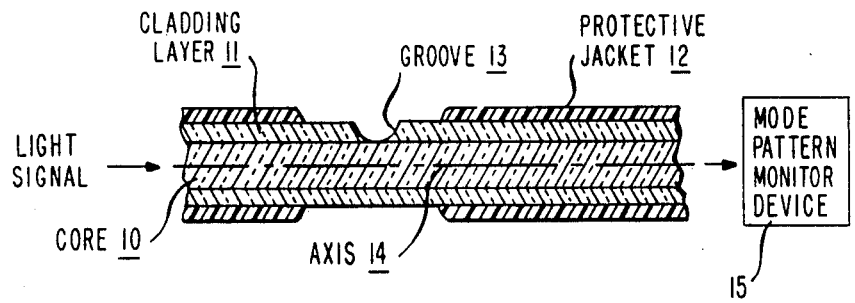
FIG. 1 is a view in cross-section of a multimode optical fiber with a protective jacket including a mode scrambling notch or groove in accordance with the present invention and a device for monitoring the mode pattern of a signal propagating in the optical fiber.

FIG. 1 is a view in cross-section of a multimode optical fiber including a core 10 of a dielectric material as glass having a first refractive index, a cladding layer 11 surrounding core 10 comprising a dielectric material as glass of a second refractive index which is lower than the first refractive index of core 10, and a protective jacket 12 surrounding cladding layer 11. It is to be understood that protective jacket 12 is generally found on optical fibers to protect the fiber from physical damage but is not a limitation of the present invention. To form the mode scrambler in accordance with the present invention, a portion of protective jacket 12 is removed or peeled back without marring the fiber, and a groove or notch 13 is formed on one side of the fiber orthogonal to the longitudinal axis 14 of the fiber and through cladding layer 11 and at least slightly penetrating the outer surface of core 10. The removal of the cladding layer material and any material from core 10 can be performed by any suitable technique as, for example, etching or machining the fiber to obtain the desired depth for groove or notch 13.

It is to be understood that the further the groove or notch 13 enters core 10, the more mode scrambling will be achieved but at the expense of increased loss due to the increased leakage of light from core 10. Therefore, it is preferred that the groove or notch 13 only slightly mar or enter the outer surface of core 10 sufficient to provide a desired mode scrambling with a minimal loss. The depth of groove or notch 13 can be controlled by, for example, transmitting a light communication signal through the fiber while the etching or machining process is being performed and monitoring the mode pattern produced with a monitoring device 15 as shown in FIG. 1. In general, it will be found that the modes in, for example, a graded index multimode fiber will be concentrated towards the center of core 10 and the mode pattern will gradually expand in diameter to fill core 10 as the groove or notch 13 touches and then enters core 10. By monitoring the mode pattern in the fiber during the etching or machining process, the process can be stopped at the point in time when the depth of groove or notch 13 causes the modes to fill the fiber. Monitoring can be performed by any suitable technique as, for example, allowing the mode pattern of the light communication signal propagating in the core to fall on a screen a short distance from the end of the fiber and viewing the mode pattern via a television camera connected to a television monitor for ease of observation.

Figure 2:
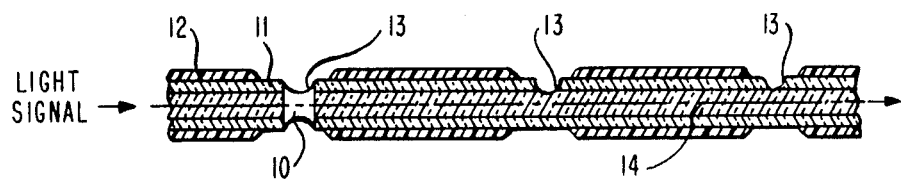
FIG. 2 is a view in cross-section of a length of a multimode optical fiber with a protective jacket including a plurality of mode scramblers as shown in FIG. 1 disposed along the length of the fiber.

To also provide complete mode scrambling with minimal loss, it is possible to provide multiple spaced-apart grooves or notches 13 along a section of fiber as shown in FIG. 2. In this manner each groove or notch 13 can be formed to slightly enter core 10 and provide at least an enhanced scrambling of the modes in the fiber with a minimal loss. The grooves can be located circumferentially around the fiber. Each subsequent groove or notch similarly adds to the mode scrambling of the first groove with a minimal loss so that after the last groove, of the multiple grooves 13, total mode scrambling is achieved to fill core 10. It is to be understood that if a protective jacket 12 is removed or peeled back to form the present mode scrambler, then after the groove or notch 13 has been formed, the protective jacket can be replaced over the groove or notch 13.

What is claimed is:
1. An optical fiber mode scrambler comprising:
a multimode optical fiber comprising:
a core of dielectric material capable of propagating a multimode light communication signal, the core including a first refractive index and an outer surface thereof;
a cladding layer surrounding the core, the cladding layer comprising a dielectric material including a second refractive index which is lower than the first refractive index of the core; and
a groove formed in the surface of the optical fiber by removing material of the optical fiber orthogonal to the longitudinal axis of the optical fiber at an intermediate point of the optical fiber, the groove formed by the removed material extending through the cladding layer and partially into the outer surface of the core to a depth to enable enhanced mode scrambling in the multimode light communication signal propagating in the core with a minimal loss of light from the core.

2. An optical fiber mode scrambler according to claim 1 wherein
the partial extension of the groove into the core is sufficient to only mar the outer surface of the core and provide a predetermined amount of mode scrambling with a minimal loss; and
the multimode optical fiber further comprising:
at least a second groove disposed orthogonal to and along the longitudinal axis of the optical fiber in a spaced-apart relationship to the first groove, the at least second groove extending through the cladding layer and partially into the outer surface of the core to further enhance mode scrambling in the multimode light communication signal propagating in the core from that provided by the first groove.

3. A method of providing an optical fiber mode scrambler, the method comprising the steps of:
(d) determining the desired position of the mode scrambler along the length of a multimode optical fiber, the optical fiber comprising (1) a core of dielectric material including a first refractive index and an outer surface, and (2) a cladding layer surrounding the core which includes a dielectric material of a second refractive index which is lower than the first refractive index of the core;
(b) at the desired position determined in step (a), forming a groove in the surface of the optical fiber by removing material of the optical fiber orthogonal to a longitudinal axis of the optical fiber, the groove formed by the removed material extending through the cladding layer and partially into the outer surface of the core to a depth to provide a predetermined amount of mode scrambling in the multimode light communication signal propagating in the core of the fiber with a minimal loss of light from the core.

4. A method of providing an optical fiber mode scrambler according to claim 3 wherein the method further comprises the step of:
(c) concurrent with step (b), monitoring a mode pattern of a light communication signal propagating through the optical fiber for stopping the groove forming step when the mode pattern fills the optical fiber by a predetermined amount.

* * * * *